United States Patent
Dunn et al.

[11] Patent Number: 5,802,227
[45] Date of Patent: Sep. 1, 1998

[54] FIBER OPTIC END COUPLING FOR A LIGHTING SYSTEM

[75] Inventors: Dennis C. Dunn, Thousand Oaks; Richard L. Swain, Sun Valley, both of Calif.

[73] Assignee: PacFab, Inc., Moorpak, Calif.

[21] Appl. No.: 784,205

[22] Filed: Jan. 15, 1997

[51] Int. Cl.[6] ............................................. G02B 6/36
[52] U.S. Cl. ............................ 385/53; 385/54; 385/115; 385/901; 362/32
[58] Field of Search ............................. 385/53, 54, 115, 385/116, 120, 901; 362/32, 276, 294, 295

[56] References Cited

U.S. PATENT DOCUMENTS

| | | | |
|---|---|---|---|
| 2,449,213 | 9/1948 | Fredrick | 200/167 |
| 4,025,779 | 5/1977 | Ahroni | 362/32 |
| 4,234,910 | 11/1980 | Price | 362/32 X |
| 4,433,675 | 2/1984 | Konoshima | 362/32 X |
| 4,782,430 | 11/1988 | Robbins | 362/32 |
| 5,072,338 | 12/1991 | Hug | 362/32 |
| 5,099,399 | 3/1992 | Miller et al. | 362/32 |
| 5,184,253 | 2/1993 | Hwang | 385/32 X |
| 5,283,718 | 2/1994 | Stephenson et al. | 362/32 |
| 5,309,330 | 5/1994 | Pillers et al. | 362/32 |
| 5,400,425 | 3/1995 | Nicholas et al. | 385/76 |

*Primary Examiner*—Phan T. H. Palmer
*Attorney, Agent, or Firm*—Pretty, Schroeder & Poplawski

[57] ABSTRACT

An improved fiber optic end coupling apparatus for a bundle of optical fibers that is heat resistant and that can precisely and easily align different-sized fiber optic bundles along an axis of the beam of light. The end coupling releasably connects one end of a fiber optic bundle to a housing containing an illumination source to light an object, which, by way of example, can be a swimming pool, a spa or the like. The cable has a bundle of exposed coaxial optical fibers in a region adjacent to the end of the cable. The coupling includes a tubular body that has a forward end and that is mounted concentrically on the bundle so that the exposed ends of the fibers are out of contact with the body and extend axially forward from the forward end of the body. The coupling also includes a connector mounted on the body in releasable engagement with the housing to support the ends of the fibers close to the illumination source. A holder is mounted forward of the forward end of the body to locate the ends of the fibers in a position to receive the light emitted by the illumination source. Therein and this hole has a centerpoint located such that light is directed along the fibers.

17 Claims, 3 Drawing Sheets ns of objects, including swimming pools, spas and the like, has become well known over the years. More recently, it has become popular to use fiber optics in swimming pool and spa lighting systems. In one particular system, a remote light source, known as an illuminator, is used to provide light to optical fibers that run from the light source to lens assemblies mounted under the waterline in the wall of a swimming pool. The illuminator has a generally cylindrical housing that encloses a light source assembly and related circuits for powering the light bulb. The light source assembly also includes a light bulb socket and a light bulb oriented to direct light through a color wheel with colored filters mounted thereon. After the light passes through one of the filters on the color wheel, it enters one end of each optical fiber, which are collectively held in alignment with the light beam of the light bulb by a tubular locator bushing and a mating compression nut.

While the aforementioned arrangement is generally acceptable, it has drawbacks under certain conditions. One particular drawback is associated with the heat generated by the light bulb and the effect of this heat upon the ends of the optical fibers located adjacent to the light bulb. In this regard, if the bushing and the ends of the optical fibers held therein reaches a certain temperature, the ends of the optical fibers can melt, thereby seriously degrading the transmission of light through the rest of the fiber optic network. Another drawback is related to the ease of mounting the bushing, which is fastened to the housing by screws that are difficult to handle and install.

Another drawback is related to the proper alignment of the fiber optic bundle and its ease of installation. In particular, because the number of optical fibers used depends upon the number of lenses used to light an object, the collective diameter of the bundle of fibers varies according to each particular application. Accordingly, if the diameter of the bundle is substantially less than the inside diameter of the locator bushing, the bushing will not hold the bundle in alignment with the axis of the beam of light coming from the light bulb. In an effort to address this problem, an installation person can place unused additional short optical fibers at the end of the bundle to increase its diameter and thereby create an interference fit with the hole in the locator bushing. However, while this method will fasten the ends of the optical fibers within the locator bushing, the optical fibers that are actually used to light the object to be lighted are not likely to be uniformly distributed on the axis of the beam of light, undesirably resulting in reduced transmission of light to that object. In other words, most of the light, which is along the axis of the light beam, may travel into the unused optical fibers that merely being used as filler and that lead nowhere.

It should therefore be appreciated that there is a need for an improved fiber optic end coupling apparatus for a bundle of optical fibers that is heat resistant and that can precisely and easily align different-sized fiber optic bundles along an axis of the beam of light. The present invention fulfills this need.

SUMMARY OF THE INVENTION

The present invention provides an improved end coupling apparatus for a bundle of optical fibers that is heat resistant and that can precisely and easily align different-sized fiber optic bundles along an axis of the beam of light. The end coupling fits within an illuminator assembly of a lighting system for an object to be lit, which, by way of example, can be a swimming pool, a spa or the like.

The end coupling releasably connects one end of a bundle of optical fibers to a housing containing an illumination source. The bundle of coaxial optical fibers is exposed in a region adjacent to the end of the bundle. The coupling includes a tubular body that has a forward end and that is mounted concentrically on the bundle so that the exposed end of the bundle of fibers is out of contact with the body and extends axially forward from the forward end of the body.

The coupling also includes a connector mounted on the body in releasable engagement with the housing to support the ends of the fibers in aligned closely spaced relation to the illumination source. A holder assembly is mounted forward of the forward end of the body to locate the ends of the fibers in a position to receive the light emitted by the illumination source. The holder assembly includes an arm and an optical fiber holder. The arm extends to a predetermined location and the optical fiber holder is mounted to the arm. The holder has an inner edge surface defining a hole sized to accept the bundle of optical fibers therein and this hole has a centerpoint located such that light is directed along the fibers. The inner surface defining the hole is radially tapered so that only a portion of the inner surface contacts the bundle of optical fibers.

Because only a portion of the inner edge of the holder touches the optical fibers, the conduction of heat from the holder to the fibers advantageously is reduced. This advantage is significant because in use the holder is exposed to the light and will thus increase its temperature. In particular, if heat from the heated holder is transferred by conduction into the fibers, they can melt and degrade the performance of the lighting system. The above arrangement minimizes the likelihood of such a melt-down.

In more detailed aspects of the invention, the holder assembly has an additional arm and the holder itself is disk shaped. In yet another aspect of the invention, the connectors are hook-shaped and mount to projections located on the housing of the illumination source. This connector arrangement advantageously allows the easy and precise installation and removal of the fiber optic end coupling without the use of troublesome mounting screws that must be removed and re-attached every time.

In yet another detailed aspect of the invention, the arm of the optical fiber holder is spaced apart from the circumferential side of the bundle of optical fibers to allow a flow of cooling air around the circumference of the fiber optic bundle. The air flow can be created by convection or can result from the use of a fan. Thus, this feature advantageously provides for the cooling of the fiber optic bundle.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings:

3

Figure 1:
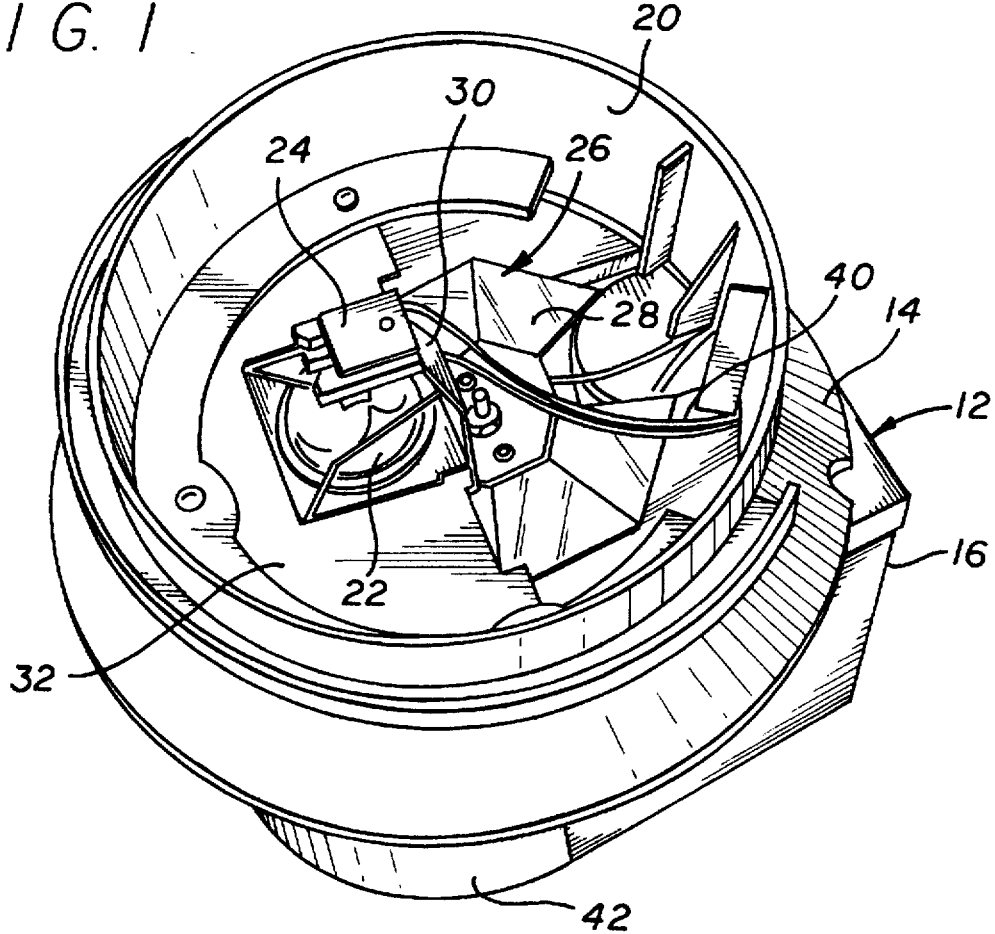
Figure 1A:
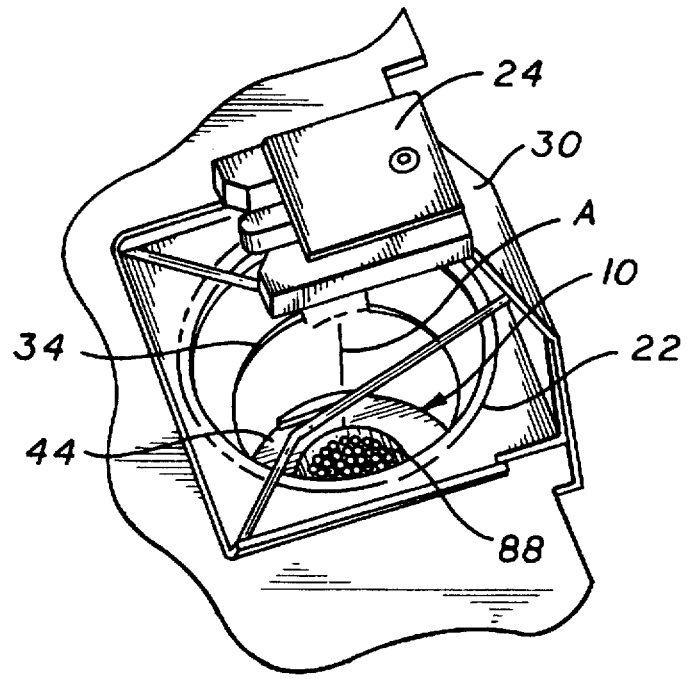

FIG. 1 is a perspective view of the inside of the top of an illuminator assembly according to the invention;

FIG. 1A is a detail perspective view of the illuminator assembly of FIG. 1.

Figure 2:
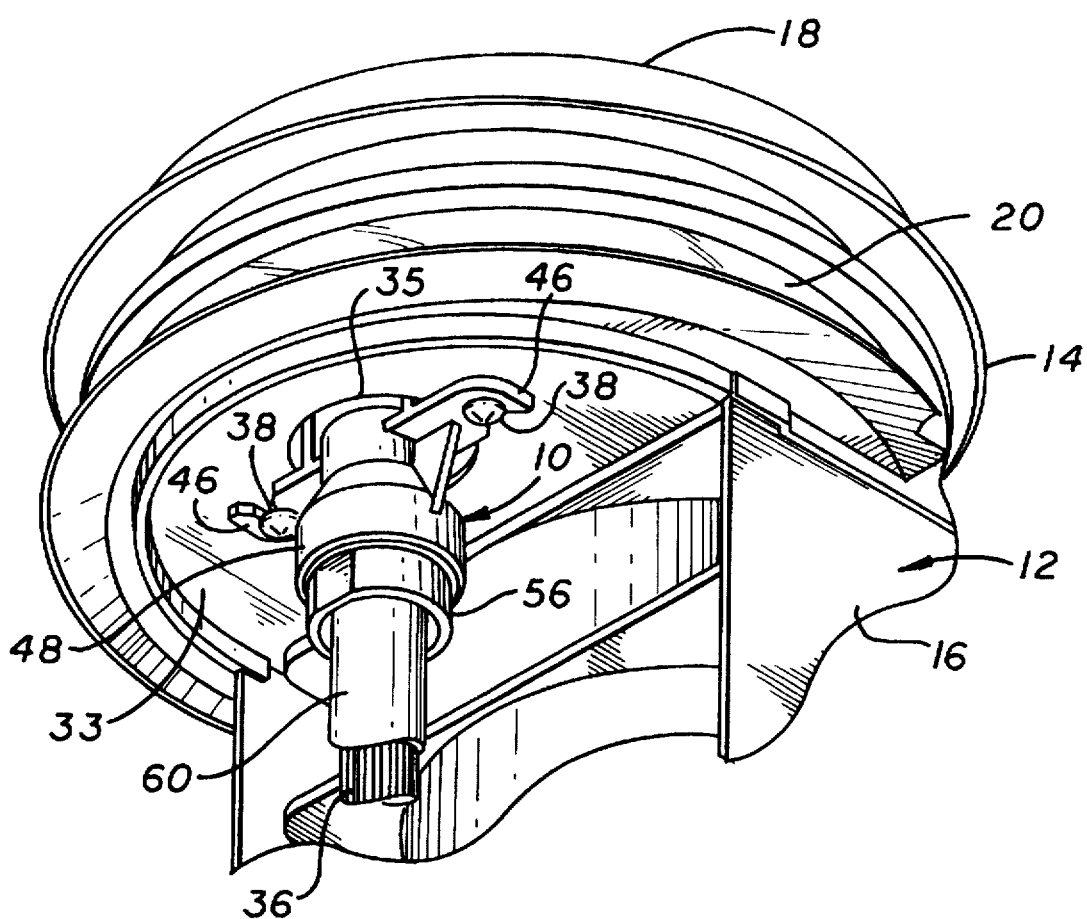
Figure 4:
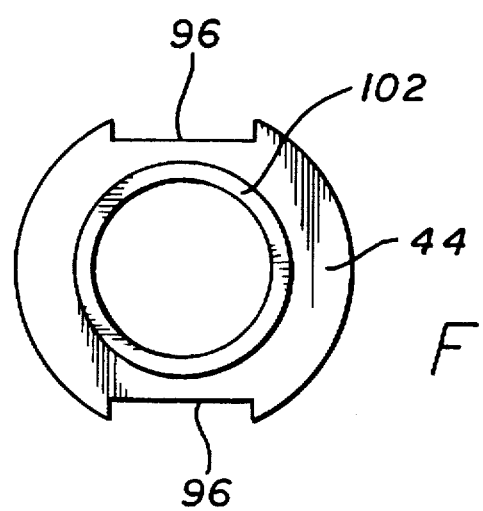
Figure 3:
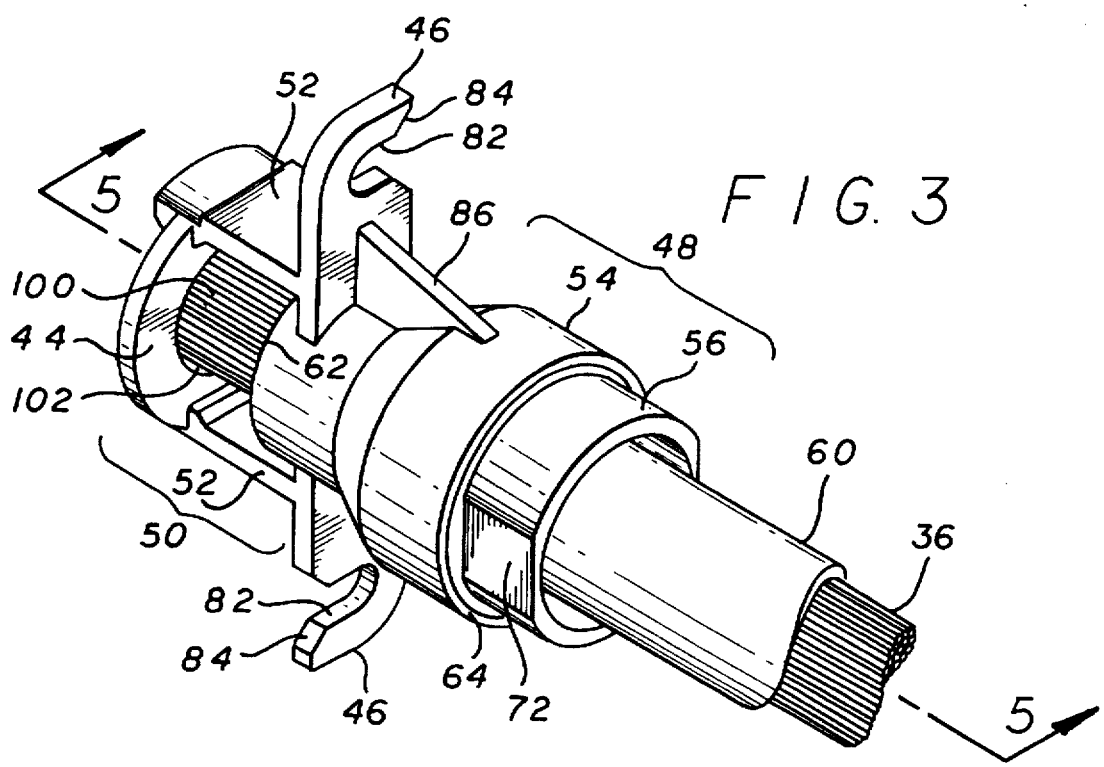
Figure 5:
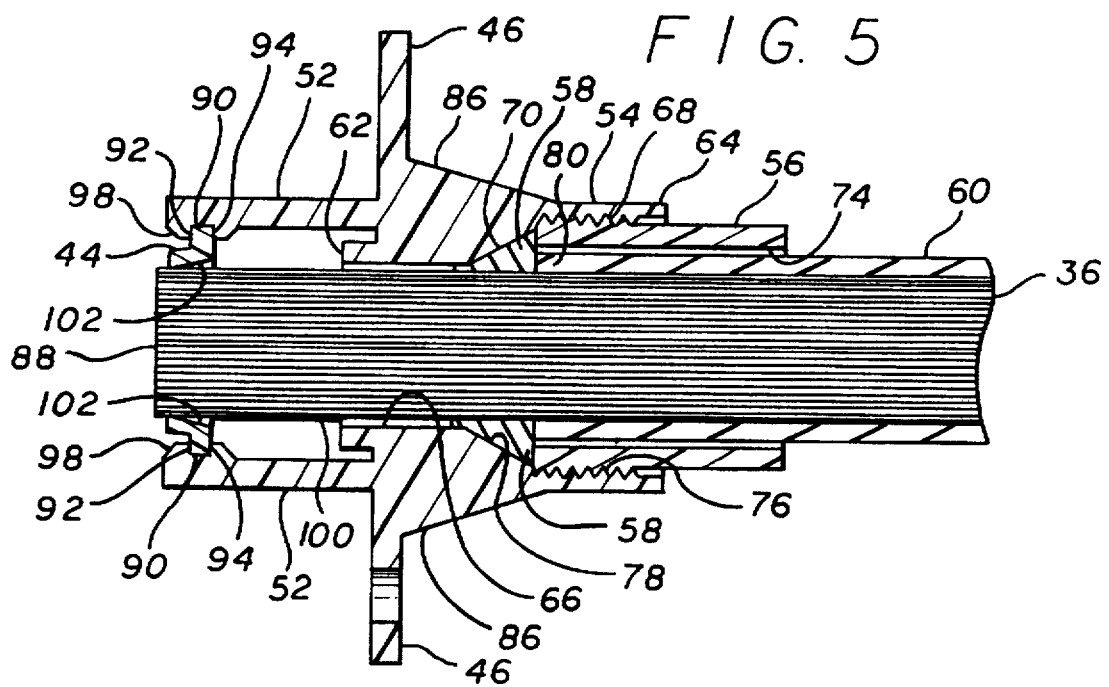

FIG. 2 is a perspective view of the area underneath the top of the illuminator assembly of FIG. 1, showing the preferred mounting ferrule assembly;

FIG. 3 is a perspective view of the mounting ferrule assembly of FIG. 2;

FIG. 4 is a plan view of the locator disk of the mounting ferrule assembly of FIG. 3; and FIG. 5 is a cross-sectional view of the mounting ferrule assembly, taken about lines 5—5 of FIG. 3.

DESCRIPTION OF THE PREFERRED EMBODIMENT

With reference now to the drawings, and particularly FIGS. 1 and 2, the present invention is preferably embodied in an improved fiber optic end coupling, generally referred to by the reference numeral 10, for an illuminator assembly 12 that provides light to a fiber optic lighting system for an object such as a swimming pool, a spa or the like. The illuminator consists of a housing assembly 14 mounted upon a base 16, from which bundles of optical fibers can extend to provide light to the object to be lighted.

The housing assembly 14 includes a circular lid 18 and a tubular window 20 that cooperatively enclose a light bulb 22 mounted in a socket 24 and a color wheel 26 mounted under the light bulb. The color wheel 26 has several colored filters 28 which may be rotated into the path of the light coming from the light bulb 22. The color wheel 26 and light bulb socket 24 are mounted to a support bracket 30, which is an integral part of a base plate 32 located under the light bulb 22. The base plate 32 has a hole 34 formed therein to allow a light beam centered about Axis A to travel from the light bulb 22 to a bundle of optical fibers 36 held by the fiber optic end coupling 10, which twist-mounts on screws 38 located underneath the base plate 32 (FIGS. 1A and 2). The base plate 38 can be made of aluminum, stainless steel or any other material of suitable strength, rigidity and corrosion resistance.

As is well known in the art, electrical wires 40 connect the light bulb 22 to a power source (not shown). Below the base plate 32, the housing 12 has an upper flange 33 with a hole 35 therein aligned with the hole 34 in the base plate 32. The upper flange 33 of the housing 12 can be made of ABS, PVC or other suitable plastic. The housing 12 also has a removable front panel 42 to provide access inside the housing 12. In this regard, it should be appreciated that for purposes of illustrating the preferred end coupling 10 the front panel 42 of the housing 12 is not shown in FIG. 2. The illuminator 12 is also described in copending U.S. utility patent application Ser. No. 08/731,797, entitled Improved Illuminator For Fiber Optic Lighting System, which is incorporated by reference and is owned by the assignee of the present invention, American Products Inc. of Moorpark, Calif.

The end coupling mounts the bundle of optical fibers 36 under the color wheel 26 in alignment with the light beam so that light passes through one of the colored filters 28 to illuminate the swimming pool with light of a particular color. As will be described below, the improved fiber optic end coupling 10 has a number of features that make it reliable and user friendly, including a snap on heat-resistant optical fiber holder 44 and hook-shaped connectors 46 that provide for convenient installation and alignment of different-sized fiber optic bundles 36 within the illuminator 12 (FIGS. 2 and 3). In particular, as will be described below, the heat-resistant optical holder 44 has a special configuration that provides for a reduced transfer of heat from the holder to the optical fibers 36. Such reduced heat transfer characteristics minimize the likelihood that the ends of the fibers 36 will melt and degrade the light transmitted throughout the lighting system.

With reference now to FIGS. 2–5, the preferred end coupling 10 has a tubular body 48, the hook-shaped connectors 46, and a optical fiber holder assembly 50 that includes two opposed arms 52 that extend axially to locate the disk-shaped optical fiber holder 44 forward of the tubular body 48. The tubular body has an outer sleeve 54 that cooperatively engages a tubular compression nut 56 and a tubular grommet 58 to hold the bundle of fibers 36, which can optionally be covered by a polymer sheath 60 and is widely available in the market. In particular, because the bundle of fibers 36 may be a collection of fibers that lead to separate pool lights, it is often not practical for a sheath to be installed upon the ends of the fibers collected for mounting in the end coupling 10. Thus, the bare fibers are held in the coupling 10 without engaging any sheath. The outer sleeve 54 has forward end 62, a rearward end 64 and an interior surface 66 defining a passage therebetween to accept the fiber bundle 36.

Threads 68 are located on the interior surface adjacent to the rearward end 64 of the sleeve 54. The interior surface 66 of the sleeve 54 defines a frustoconical shape 70 located forward of the threads 68.

The compression nut 56 has external wrench flats 72 and an internal surface 74 that defines a passage axially through the nut 56. The diameter of the passage is sufficient to allow the optical fibers 36 and 60 to fit therein. The nut 56 also has external threads 76 sized to engage the threads 68 of the outer sleeve 54. Both the nut 56 and the sleeve 54 can be made from ABS, PVC or polycarbonate plastic or any other material of suitable strength and durability. As is well known in the art, injection molding can be used to form these components. The grommet 58 has a frustoconical surface 78 formed upon its forward end and also has a through hole 80 of sufficient diameter allow the fiber bundle 36 to fit therein. The frustoconical surface 78 of the grommet 58 is sized to interferingly engage the frustoconical surface 70 inside the outer sleeve 54 so that, as the grommet 58 is driven into the sleeve by the compression nut 56, the grommet 58 collapses radially to securely clamp the the optical fibers 36 (FIG. 5). The grommet 58 can be made by injection molding resilient thermoplastic rubber material, such as Santoprene® or Vistoflex® brand rubber.

The hook-shaped connectors 46 are integrally formed 180 degrees apart adjacent to the forward end 62 of the body 48 and extend radially outwardly. A slot 82 is formed near the end of each connector 46 to engage the bodies of the locator screws 38 mounted on the underside of the base plate 32. The slots 82 extend in opposite directions so that a clockwise rotation will engage each slot 82 with its associated screw 38. Both slots 82 also have beveled edges 84 so that the they are easy to locate on the bodies of the screws 38. The heads of the screws 38 fit over the connectors 46 to fasten the end coupling 10 to the housing flange 33. For added structural integrity, opposing integral flanges 86 join the connectors 46 to the side of the outer body sleeve 54. The above connector arrangement advantageously allows the easy and precise installation and removal of the fiber optic end coupling 10 without the use of troublesome mounting screws that must be removed and re-attached every time.

As shown in FIG. 5, the holder assembly 50 has two opposed arms 52 that extend axially from the connectors 46 to hold the optical fiber holder disk 44 in a position to locate the ends 88 of the optical fibers 36 forward of the tubular body 48 in alignment with the axis A of the light from the light bulb 22. The arms 52 have opposing notches 90 located forward of the tubular body 48. Each notch 90 has a forward wall 92 and a rearward wall 94 to snugly accept an associated flat peripheral edge 96 of the optical fiber holder 44 therebetween. The forward edge 98 of each arm 52 is also beveled to facilitate the flexing of the arms 52 as the optical fiber holder disk 44 is snapped between the arms 52. The arms are spaced apart from the circumferential surface 100 of the fiber optic bundle 36 so that air can flow around the bundle. Natural convection or an electric fan can provide such air flow. This cooling of the circumferential side surface 100 of the bundle 36 advantageously reduces the likelihood that the fibers will overheat and melt.

The configuration of the optical fiber holder disk 44 is shown in FIGS. 4 and 5. The opposing flat peripheral edges 96 are spaced apart a distance sufficient to allow the disk 44 to fit between the notches 90 on the opposing arms 52. The holder disk 44 has an inner edge surface 102 that defines a hole sized to snugly accept the bundle of optical fibers 36 therein. The hole has a centerpoint located along axis A so that most of the light is directed along the fibers 36. Significantly, the inner surface 102 defining the hole is radially tapered so that only a tiny portion of the inner surface 102 contacts the optical fibers 36. The portion of the inner edge surface 102 of the disk 44 that contacts the fibers 36 can be a very thin area referred to as "line" contact. Because only a portion of the inner edge 102 of the disk 44 touches the sides of the optical fibers 36, the conduction of heat from the disk 44 to the fibers 36 advantageously is reduced. This advantage is significant because in use the bright light falling on the disk 44 will increase its temperature. Then, if heat from the heated disk 44 is transferred by conduction into the fibers 36, they can melt and degrade the performance of the entire lighting system. The above arrangement minimizes the likelihood of such a melt-down. The holder assembly 50 and the connectors 46 can be injection molded from the same materials used to make the body.

Because the holder disk 44 easily snaps between the arms 52, a field installation person can be provided with numerous disks 44 which have holes of various diameters. Thus, the field installation person can pick a holder disk 44 which closely fits the diameter of the fiber optic bundle 36 of a particular application. Because there then is a close fit between the holder 44 and the fiber optic bundle 36, the bundle 36 advantageously is centered about the axis A of the light bulb's light, thereby ensuring the maximum distribution of the light throughout the lighting system.

While a particular form of the invention has been illustrated and described, it will be apparent that various modifications can be made without departing from the spirit and scope of the invention. Accordingly, it is not intended that the invention be limited, except as by the appended claims.

We claim:

1. An end coupling for releasably connecting one end of a bundle of axially aligned optical fibers to a housing for an illumination source, the optical fibers exposed in a region adjacent to the end of the bundle, the end coupling comprising:

a tubular body mounted concentrically about the bundle and having a forward end, the exposed end of the bundle of fibers out of contact with said body and extending axially forward from said forward end of said body in spaced concentric relation thereto;

a connector mounted on said body in releasable engagement with the housing to support the ends of the fibers in aligned closely spaced relation to the illumination source; and a holder assembly mounted forward of said forward end of said body to locate the ends of the fibers in a position to receive the light emitted by the illumination source, the holder having an arm extending to a predetermined location and spaced apart from the fibers to allow air flow adjacent to said fibers, and an optical fiber holder mounted to the arm, said holder having an inner edge surface defining a hole sized to accept the bundle of optical fibers therein, the hole having a centerpoint located such that the bundle of fibers is positioned in the light emitted by the illumination source, the inner surface defining the hole being radially tapered so that only a portion of said inner surface contacts the bundle of optical fibers.

2. The end coupling of claim 1, wherein said tubular body comprises:

a tubular outer sleeve having a forward end, a rearward end and internal threads located adjacent to the rearward end, said outer sleeve further having an interior frustoconical surface located forwardly of said threads;

a tubular grommet with a frustoconical forward end sized to fit within said tubular outer sleeve and interferingly engage the frustoconical surface within said outer sleeve; and a tubular compression nut with external threads sized to rotatably engage the internal threads on said outer sleeve to move the nut into said outer sleeve to move said grommet into the frustoconical surface of said outer sleeve to contract radially inward toward the bundle of optical fibers.

3. The end coupling of claim 2, further comprising a sheath mounted about the optical fibers, said sheath fitting within the grommet and being clamped thereby upon the movement of the compression nut.

4. The end coupling of claim 1, wherein said holder assembly further comprises another arm spaced from said first arm, said additional arm extending to a second predetermined location and wherein said optical fiber holder is mounted between said arms.

5. The end coupling of claim 4, wherein said arms each have a notch and said optical fiber holder further comprises two indentations, each said indentation located to snap into an associated one of the notches of said arms.

6. The end coupling of claim 1, wherein said arms on said holder assembly are spaced 180 degrees apart and wherein said holder is disk-shaped.

7. The end coupling of claim 1, wherein said connector comprises two hooks spaced to releasably engage two projections mounted upon said housing.

8. An end coupling for releasably connecting one end of a bundle of axially aligned optical fibers to a housing for an illumination source, the optical fibers exposed in a region adjacent to the end of the bundle, the end coupling comprising:

a tubular body mounted concentrically on the fiber optic bundle and having a forward end, the exposed end of the bundle of fibers out of contact with said body and extending axially forward from said forward end of said body in spaced concentric relation thereto;

a connector mounted on said body in releasable engagement with the housing to support the ends of the fibers in aligned closely spaced relation to the illumination source; and a holder assembly mounted forward of said forward end of said body to locate the ends of the fibers in a position to receive the light emitted by the illumination source, the holder having two opposed arms, each arm extending to a predetermined location and spaced apart from the fibers to allow air flow adjacent to said fibers, and an optical fiber holder mounted between said arms, said holder having an inner edge surface defining a hole sized to accept the bundle of optical fibers therein, the hole having a centerpoint located such that the bundle of fibers is centered in the light emitted by the illumination source, the inner surface defining the hole being radially tapered so that only a portion of said inner surface contacts the bundle of optical fibers.

9. The end coupling of claim 8, wherein said tubular body comprises:

a tubular outer sleeve having a forward end, a rearward end and internal threads located adjacent to the rearward end, said outer sleeve further having an interior frustoconical surface located forwardly of said threads;

a tubular grommet with a frustoconical forward end sized to fit within said tubular outer sleeve and interferingly engage the frustoconical surface within said outer sleeve; and a tubular compression nut with external threads sized to rotatably engage the internal threads on said outer sleeve to move the nut into said outer sleeve to move said grommet into the frustoconical surface of said outer sleeve to clamp the sheath of the fiber optic cable.

10. The end coupling of claim 9, wherein said arms each have a notch and said optical fiber holder further comprises two indentations, each said indentation located to snap into an associated one of the notches of said arms.

11. The end coupling of claim 10, wherein said connector comprises two hooks spaced to releasably engage two projections mounted upon said housing.

12. The end coupling of claim 11, wherein said projections are screws.

13. The end coupling of claim 9, further comprising a sheath mounted about the optical fibers, said sheath fitting within the grommet and being clamped thereby upon the movement of the compression nut.

14. The end coupling of claim 8, wherein said connector comprises two hooks spaced to releasably engage two projections mounted upon said housing.

15. The end coupling of claim 14, wherein said projections are screws.

16. The end coupling of claim 8, wherein said arms on said holder assembly are spaced 180 degrees apart and wherein said holder is disk-shaped.

17. The end coupling of claim 8, wherein said arms each have a notch and said optical fiber holder further comprises two indentations, each said indentation located to snap into an associated one of the notches of said arms.

* * * * *